Jan. 4, 1938.  W. D. OWSLEY  2,104,270
CEMENTING EQUIPMENT FOR WELLS
Filed May 24, 1937
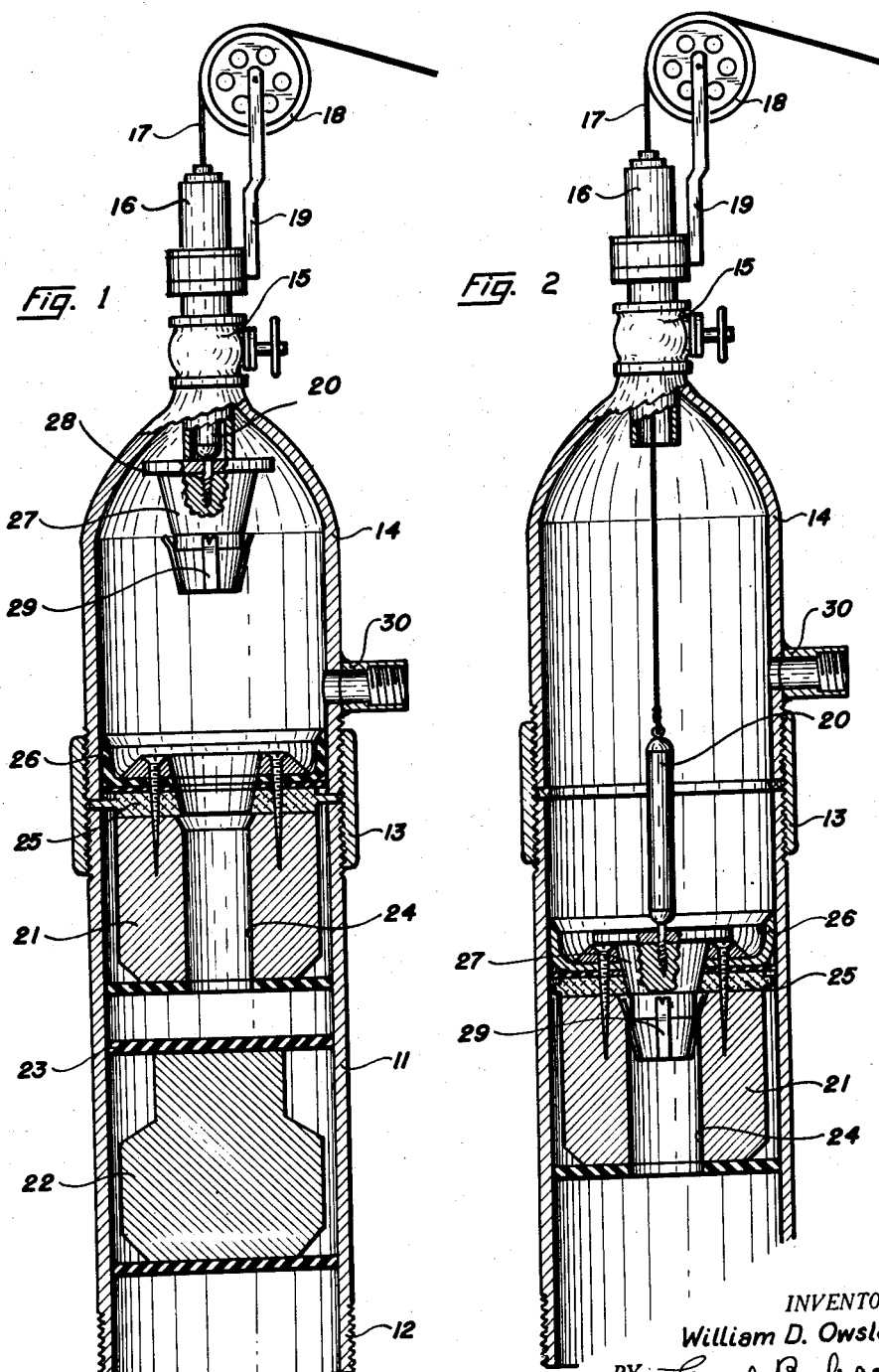
INVENTOR.
William D. Owsley.
BY Earl Babcock
ATTORNEY Patented Jan. 4, 1938

2,104,270

UNITED STATES PATENT OFFICE 2,104,270

CEMENTING EQUIPMENT FOR WELLS

William D. Owsley, Duncan, Okla., assignor to Halliburton Oil Well Cementing Company, Duncan, Okla.

Application May 24, 1937, Serial No. 144,399

7 Claims. (Cl. 166—1)

This invention relates to cementing equipment for oil wells or the like, and more particularly to apparatus adapted for use in the cementing of casings in oil wells.

Where plugs are used in the cementing of casing in an oil well, it is customary practice to cause one plug to precede a body of cement slurry and another plug to follow the slurry as it is pumped into the well. It is desirable to mount the plug which follows the slurry in the casing before the pumping operations begin and suspend the same there until the proper time after which it is released and pumped on down with the cement. Equipment for supporting the plug which follows the cement is called a plug container or cement head for the well and consists of a section of pipe closed on top and screw threaded at the bottom to make a connection with the casing. The plug is mounted in the head being held in position by a manually operated pin. A suitable manifold and valves are connected to the cement head for causing fluid to enter the head, first below and then above the plug held therein. Apparatus somewhat similar to that now commonly employed in the field is shown in the patent to Perkins et al., No. 1,011,484, patented December 12, 1911, for "Method of cementing oil wells".

For keeping track of and measuring the depth of the plug which follows the slug of cement, measuring line equipment is commonly employed, the line passing through a stuffing box mounted on the cementing head. The line is connected to a weight which is intended to rest upon the plug during its travel downward through the casing. Measuring line equipment is shown in the patents to Halliburton, Nos. 1,369,891, patented March 1, 1921, for "Method and means for cementing oil wells", and 1,692,037, patented November 20, 1928, for "Well sounding device".

It is an object of the present invention to provide a cement head or plug container adapted for use in the cementing of casing in an oil well which will be simpler in construction, easier to operate and less expensive than similar equipment heretofore employed and which will have certain advantages in operation over the previously proposed equipment.

It is a further object of the invention to provide a novel combination of cement head, plug and measuring line in which the plug is provided with a novel valve arrangement which will be seated by manipulation of the measuring line to cause the plug to move downwardly into the well.

It is a further object of the invention to devise novel means for connecting the measuring line to a plug used in the cementing of an oil well to insure that the plug does not travel faster than the measuring line and to obtain more accurate information as to the condition of the well during the cementing operation.

It is a further object of the invention to provide a cement head for use in connection with the oil wells in which manifolds and valves are dispensed with, the cement being pumped through the plug which follows the cement until the valve therein seats.

It is still a further object of the invention to devise a novel method of cementing wells in which the cement slurry is pumped through the plug which is to follow the slurry.

Other objects and advantages reside in certain novel features of the method and apparatus as will be more apparent from the following description taken in connection with the accompanying drawing, in which:

Figure 1 is a vertical cross-sectional view of a cement head constructed in accordance with the principles of the invention and showing plugs mounted therein, together with a portion of the measuring line equipment connected thereto; and Figure 2 is a vertical cross-sectional view similar to that of Figure 1, but showing the position of the plug and measuring line equipment after the cement has been pumped into the casing and the upper plug started downwardly therein.

Referring to the drawing in detail, it will be seen that a cement head is there illustrated as consisting of a section of pipe 11 threaded at its lower end as shown at 12 so that it may be connected to the casing of an oil well. By means of a collar 13 a nipple 14 is connected to the top of the section of pipe 11. The upper end of the nipple 14 is provided with a safety valve 15 and with a stuffing box 16 through which the measuring line 17 passes. The line is supported on a pulley 18 mounted on a bracket 19 swivelled to the stuffing box structure as illustrated. In accordance with usual practice, the lower end of the measuring line 17 is connected to a weight 20.

Two cementing plugs designated 21 and 22 are mounted within the cementing head. The lower of these plugs 22 is of usual construction and may consist of a wooden body to which packing rings 23 are attached. The plug 22 is intended to precede the slug of cement slurry which is to be pumped into the well and is not supported in the cement head by any means other than the friction of the packing rings.

The upper plug 21 is similar to the lower plug 22 except that it is provided with a central passageway or bore 24 the upper portion of which is tapered as illustrated to provide a valve seat. To mount the plug 21 in the head, a supporting ring 25 which may be made of aluminum or the like is made integral with the plug. The ring 25 has a flange adapted to be clamped between the section of pipe 11 and the nipple 14 as the cementing head is made up. For maintaining a seal between the plug and the wall of the casing, suitable packing rings may be employed. The upper of these packing rings is preferably cupped as illustrated at 26 so as to aid in causing the plug to move downwardly at the proper time.

Means is provided for closing the bore or passageway 24 in the plug 21, this means consisting of a valve body 27 connected by means of a screw 28 to the weight 20 suspended on the measuring line 17. The valve body 27 is conical in shape and adapted to seat in the tapered upper portion of the bore 24 when the measuring line is released to allow the weight and valve body to travel downwardly against the plug 21. Suitable spring latching means 29 are provided on the bottom of the valve body 27, these latch springs being adapted to latch beneath the ring 25 when the valve seats. Thus, when the valve body 27 is seated on the plug 21, fluid cannot pass through the passageway 24 either up or down and the plug cannot "over-run" the cement slurry when being pumped down above the slurry.

To provide a connection for forcing cement or other fluid into the well when the cement head is connected thereto, the coupling member 30 is welded or otherwise secured to the nipple 14 so that a hose or other connection can be made to the cement head above the point where the plug 21 is supported therein.

The operation of the equipment just described in cementing casing in a well is as follows:

With the parts in the position shown in Figure 1, the cement head is connected to the casing and a hose or other conduit is connected to the coupling member 30 on the nipple 14. Cement slurry is then pumped through the hose, the slurry passing through the bore 24 in the plug 21 and forcing the plug 22 downwardly ahead of it. After the desired amount of slurry is placed between the plugs 21 and 22 in this manner, the measuring line is released, causing the valve body 27 to seat upon the plug 21. Water, mud or other fluid is then forced through the hose into the nipple 14 and since the bore 24 in the plug 21 is then sealed, the pressure of the pumps will be exerted upon the plug 21 to cause it to move downwardly, the flange on the ring 25 shearing to allow this action to take place. The parts will then be in the position shown in Figure 2.

When the measuring line is released and the valve body 27 seated, the measuring line is automatically connected to the plug 21. After the slurry and the plugs have been pumped down to the desired location in the well to place the cement, the measuring line is held and pump pressure further exerted to cause the screw 28 to shear or pull out of the valve body 27 so that the measuring line and the weight can be removed from the well. After the cement has hardened the plugs 21 and 22 may be drilled out in accordance with the usual practice.

A particular advantage in the present invention results from the fact that no connections need be changed or valves manipulated in causing the upper plug 21 to move downwardly in the well. A further advantage results from the fact that the measuring line is connected to the plug 21 when the valve body 27 seats therein. While the making of this connection is believed to be advantageous, the arrangement is such that after the valve body 27 seats the measuring line may be disconnected therefrom immediately before the plug 21 passes downwardly, if the operator so desires, inasmuch as sufficient tension may be placed upon the measuring line to pull the screw 28 out of the valve body 27 before the plug 21 moves downwardly.

While only one embodiment of the invention has been shown and described herein, it is obvious that various changes may be made in the arrangement of parts or in the method of operation, without departing from the spirit of the invention or the scope of the annexed claims.

I claim:

1. Apparatus for use in the cementing of oil wells or the like which includes a cementing head adapted to be connected to the casing of the well, a plug supported in the head, said plug having a passageway therein, means for conveying cement slurry under pressure into the head above the point where the plug is supported therein to cause the same to flow through the passageway in said plug, a valve body adapted to seat upon the plug to close the passageway and control means for causing the seating of the valve body on said plug whereupon fluid pressure may be exerted upon the plug to cause the same to follow the slurry into the well.

2. Apparatus for use in the cementing of an oil well or the like which includes a cementing head adapted to be connected to the casing of the well, a plug supported in the head, said plug having a passageway therein, a valve body adapted to seat on said plug to close the passageway therein, and a measuring line connected to said valve body to control the seating thereof upon said plug.

3. Apparatus for use in the cementing of an oil well or the like which includes a cementing head adapted to be connected to the casing of the well, a plug having a passageway therein, shearable means for supporting said plug in said head, a valve body adapted to seat on said plug to close the passageway therein, and means for releasably supporting said valve body above said plug so that cement slurry may be pumped into said head and through the passageway in said plug after which the valve body may be caused to seat upon said plug and the supporting means for the plug sheared by exerting fluid pressure upon said plug.

4. Apparatus for use in the cementing of an oil well or the like which includes a cementing head adapted to be connected to the casing of the well, a plug having a passageway therein, shearable means for supporting said plug in said head, a valve body adapted to seat on said plug to close the passageway therein, and a measuring line connected to said valve body for supporting the same above said plug so that cement slurry may be pumped into said head and through the passageway in said plug after which the measuring line may be lowered to cause the valve body to seat upon said plug and the supporting means for the plug sheared by exerting fluid pressure upon the plug to cause it and the measuring line to follow the cement slurry down into the well.

5. Apparatus for use in cementing wells which includes a cementing head, a plug means for releasably securing the same to said head, said plug having a passageway therein, means for supplying cement slurry to the head above the plug so that it may flow through the passageway in the plug, and means for sealing the passageway whereupon the plug may be forced downwardly above the slurry when said plug securing means is released.

6. The method of cementing an oil well or the like which includes the steps of releasably supporting a valved plug in a cementing head on the casing of the well, pumping cement slurry into the head and through the plug with the valve open, closing the valve and exerting fluid pressure on the plug with the valve closed to release the plug from the head and cause it to move downwardly in the well with the slurry.

7. The method of cementing an oil well or the like which includes the steps of releasably supporting a plug having a passageway in a cementing head on the casing of the well, placing a valve body in the head, connecting a measuring line to the valve body, pumping cement slurry into the head and through the passageway in the plug, operating the measuring line to cause the valve body to close the passageway and latch thereon to connect the valve body and the measuring line to the plug and exerting fluid pressure on the plug to release the plug from the head and cause the plug and measuring line to move downwardly in the well with the slurry.

WILLIAM D. OWSLEY.